(12) United States Patent
Choi et al.

(10) Patent No.: US 8,538,453 B2
(45) Date of Patent: Sep. 17, 2013

(54) LOCATION TRACKING METHOD IN COORDINATOR-BASED WIRELESS NETWORK

(75) Inventors: Yun-hwa Choi, Seoul (KR); Hyong-uk Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/751,131

(22) Filed: Mar. 31, 2010

(65) Prior Publication Data

US 2010/0189082 A1    Jul. 29, 2010

Related U.S. Application Data

(63) Continuation of application No. 11/189,061, filed on Jul. 26, 2005.

(30) Foreign Application Priority Data

Jul. 26, 2004    (KR) .................. 10-2004-0058263
Oct. 27, 2004    (KR) .................. 10-2004-0086226

(51) Int. Cl.
*H04W 24/00*    (2009.01)
*H04W 4/00*    (2009.01)
*H04L 12/28*    (2006.01)
*H04L 12/66*    (2006.01)

(52) U.S. Cl.
USPC .............. 455/456.1; 455/456.2; 455/456.3; 370/354; 370/338; 370/361

(58) Field of Classification Search
USPC ........................................ 370/338
See application file for complete search history.

(56) References Cited

U.S. PATENT DOCUMENTS

| | | | |
|---|---|---|---|
| 5,666,662 A | 9/1997 | Shibuya | |
| 6,304,556 B1* | 10/2001 | Haas | 370/254 |
| 6,370,378 B1 | 4/2002 | Yahagi | |
| 6,438,380 B1 | 8/2002 | Bi et al. | |
| 6,674,403 B2 | 1/2004 | Gray et al. | |
| 7,042,867 B2* | 5/2006 | Whitehill et al. | 370/338 |
| 2001/0012279 A1* | 8/2001 | Haumont et al. | 370/331 |

(Continued)

FOREIGN PATENT DOCUMENTS

| | | |
|---|---|---|
| CN | 1261436 A | 7/2000 |
| CN | 1135040 C | 1/2004 |

(Continued)

OTHER PUBLICATIONS

Tseng, et al., "Location Tracking in a Wireless Sensor Network by Mobile Agents and Its Data Fusion Strategies," pp. 1-20.

(Continued)

*Primary Examiner* — Christopher M Brandt
*Assistant Examiner* — Muthuswamy Manoharan
(74) *Attorney, Agent, or Firm* — Sughrue Mion, PLLC

(57) ABSTRACT

A location tracking method in a coordinator-based wireless network is provided. The location tracking method in a coordinator-based wireless network includes transmitting a first frame including its own identifier and time information to the wireless network by a device associated with the wireless network in order to disclose its location information; and receiving a second frame including the location information of the device transmitted from the wireless network by the device, as a response to the first frame.

12 Claims, 12 Drawing Sheets

(56) References Cited

U.S. PATENT DOCUMENTS

| | | | |
|---|---|---|---|
| 2002/0115448 A1* | 8/2002 | Amerga et al. | 455/456 |
| 2002/0169539 A1* | 11/2002 | Menard et al. | 701/200 |
| 2003/0227895 A1 | 12/2003 | Strutt et al. | |
| 2004/0002346 A1 | 1/2004 | Santhoff | |
| 2004/0078151 A1 | 4/2004 | Aljadeff et al. | |
| 2005/0058084 A1 | 3/2005 | Hester et al. | |
| 2005/0122929 A1* | 6/2005 | Zuniga | 370/328 |
| 2005/0202832 A1 | 9/2005 | Sudit et al. | |
| 2005/0251326 A1* | 11/2005 | Reeves | 701/200 |
| 2006/0007863 A1* | 1/2006 | Naghian | 370/238 |
| 2006/0015503 A1* | 1/2006 | Simons et al. | 707/10 |
| 2006/0018295 A1 | 1/2006 | Choi et al. | |
| 2006/0116170 A1 | 6/2006 | Brahmbhatt et al. | |
| 2006/0125631 A1 | 6/2006 | Sharony | |
| 2007/0279167 A1* | 12/2007 | Schmid et al. | 335/229 |
| 2008/0279167 A1* | 11/2008 | Cardei et al. | 370/342 |

FOREIGN PATENT DOCUMENTS

| | | | |
|---|---|---|---|
| JP | 2001-523337 A | 11/2001 | |
| JP | 2003087175 A | 3/2003 | |
| JP | 2004-080312 A | 3/2004 | |
| KR | 2002-0015546 A | 2/2002 | |
| KR | 2003-0024460 A | 3/2003 | |
| KR | 2003-0052841 A | 6/2003 | |
| WO | 2004/054304 A1 | 6/2004 | |

OTHER PUBLICATIONS

Ogino Aso, Hisasihara Gashiko, Yano Kagasi, Watanabe Goji, Gato Dakesi, Sjki Hideya, "Wireless LAN General Access System (1)—Examination of Position-detecting System-", 2003 Electronic Information Communication Society Convention Collection of Learned Papers 1, p. 662, B-5-203, Mar. 2, 2003.

Hisasihara Gashiko, Ogino Aso, Hujisima Gensabura, Gato Dakesi, Sjki Hideya, "Wireless LAN General Access System (2)—Examination of Position detecting System-" 2003 Electronic Information Communication Society Convention Collection of Learned Papers 1, p. 663, B-5-204, Mar. 2, 2003.

Gurojaki Yassi, Saito Daro, "Utilization of Wireless Information System using Wireless LAN", Computer & LAN, Issue of Nov. 2003, pp. 49-56, Ohom Co., Ltd., Nov. 1, 2003.

Jose A Gutierrez et. al.: "IEEE 802.15.4: A Developing Standard for Low-Power Low-Cost Wireless Personal Area Networks" IEEE Network, IEEE Service Center, New York, NY, US, vol. 15, No. 5, Sep. 1, 2001, pp. 12-19.

"IEEE Standard for Information technology—Telecommunications and information exchange between systems—Local and metropolitan area networks Specific requirements Part 15.4: Wireless Medium Access Control (MAC) and Physical Layer (PHY) Specifications for Low-Rate Wireless Personal Area Networks (LR-WPANs)", Jan. 1, 2003, IEEE Std. 802.15.41m-2003; IEEE, New York, NY, US, pp. 1-680.

Sahinoglu Z. et. al.: "A Hybrid Location Estimation Scheme (H-LES) for Partially Synchronized Wireless Sensor Networks", TR-2003-142, Jan. 2004.

Feng Zhao et. al.: "Wireless Sensor Networks", Jan. 15, 2004, MK publishers, XP040426274, 378 pages.

Ed Callaway et. al.: "Home Networking with IEEE 802.15.4: A Developing Standard for Low-Rate Wireless Personal Area Networks" IEEE Communications Magazine, IEEE Service Center, Piscataway, US, vol. 40, No. 8, Aug. 1, 2002, pp. 70-77.

"IEEE P802.15 Wireless Personal Area Networks", IEEE, Piscataway, NJ. USA, XP040388838, Jul. 23, 2004, pp. 1-34.

Hara S et. al.: "Propagation Characteristics of IEEE 802.15.4 Radio Signal and Their Application for Location Estimation" 2005 IEEE 61st Vehicular Technology Conference, May 30-Jun. 1, 2005—Stockholm, Sweden, IEEE, Piscataway, NJ, USA LNKD DOI: 10.1109/VETECS.2005.1543257, vol. 1, May 30, 2005, pp. 97-101.

Vernez J. et. al.: "Adaptation of the IEEE 802.15.4 Mac Layer to an ultra wide band radiofrequency physical layer" Personal, Indoor and Mobile Radio Communications, 2004. PIMRC 2004.15th IEEE International Symposium on Barcelona, Spain 5-8, 2004, Piscataway, NJ, USA, IEEE, Piscataway, NJ, USA LNKD DOI:10.1109/PIMRC. 2004.1368867, vol. 4, Sep. 5, 2004, pp. 2983-2987.

Ying-Hong Wang et. al.: "A Hybrid Wireless Network Approach to Support QoS Data Transmission" Parallel and Distributed Systems, 2005, Proceedings. 11th International Conference on Fukuoka, Japan Jul. 20-22, 2005, Piscataway, NJ, USA, IEEE, vol. 2, Jul. 20, 2005, pp. 393-396, XP010852857 ISBN:978-0-7695-2281-4.

Ash J. N. et. al.: "Locating the nodes" IEEE Signal Processing Magazine, IEEE Service Center, Piscataway, NJ, US LNKD DOI: 10.1109/MSP.2005.1458287, vol. 22, No. 4, Jul. 1, 2005, pp. 54-69.

Al-Chun Pang et al.: "Dynamic Backoff for wireless personal networks" Global Telecommunications Conference, 2004. GLOBECOM '04. IEEE Dallas, TX, USA Nov. 29-Dec. 3, 2004, Piscataway, NJ, USA,IEEE, Piscataway, NJ, USA LNKD DOI: 10.1109/GLOCOM.2004.1378248, vol. 3, Nov. 29, 2004, pp. 1580-1584.

Communication and Extended European Search Report dated Sep. 6, 2010, issued by the European Patent Office in counterpart European Application No. 05254601.7-2414.

Office Action dated Jan. 9, 2013 issued in U.S. Appl. No. 11/189,061.

Non-Final Office Action dated Nov. 16, 2006 issued in U.S. Appl. No. 11/189,061.

Non-Final Office Action dated Jun. 4, 2007 issued in U.S. Appl. No. 11/189,061.

Final Office Action dated Jul. 29, 2008 issued in U.S. Appl. No. 11/189,061.

Non-Final Office Action dated Feb. 23, 2009 issued in U.S. Appl. No. 11/189,061.

Final Office Action dated Sep. 30, 2009 issued in U.S. Appl. No. 11/189,061.

Non-Final Office Action dated Jul. 9, 2010 issued in U.S. Appl. No. 11/189,061.

Final Office Action dated Nov. 4, 2010 issued in U.S. Appl. No. 11/189,061.

Non-Final Office Action dated Jul. 6, 2012 issued in U.S. Appl. No. 11/189,061.

* cited by examiner

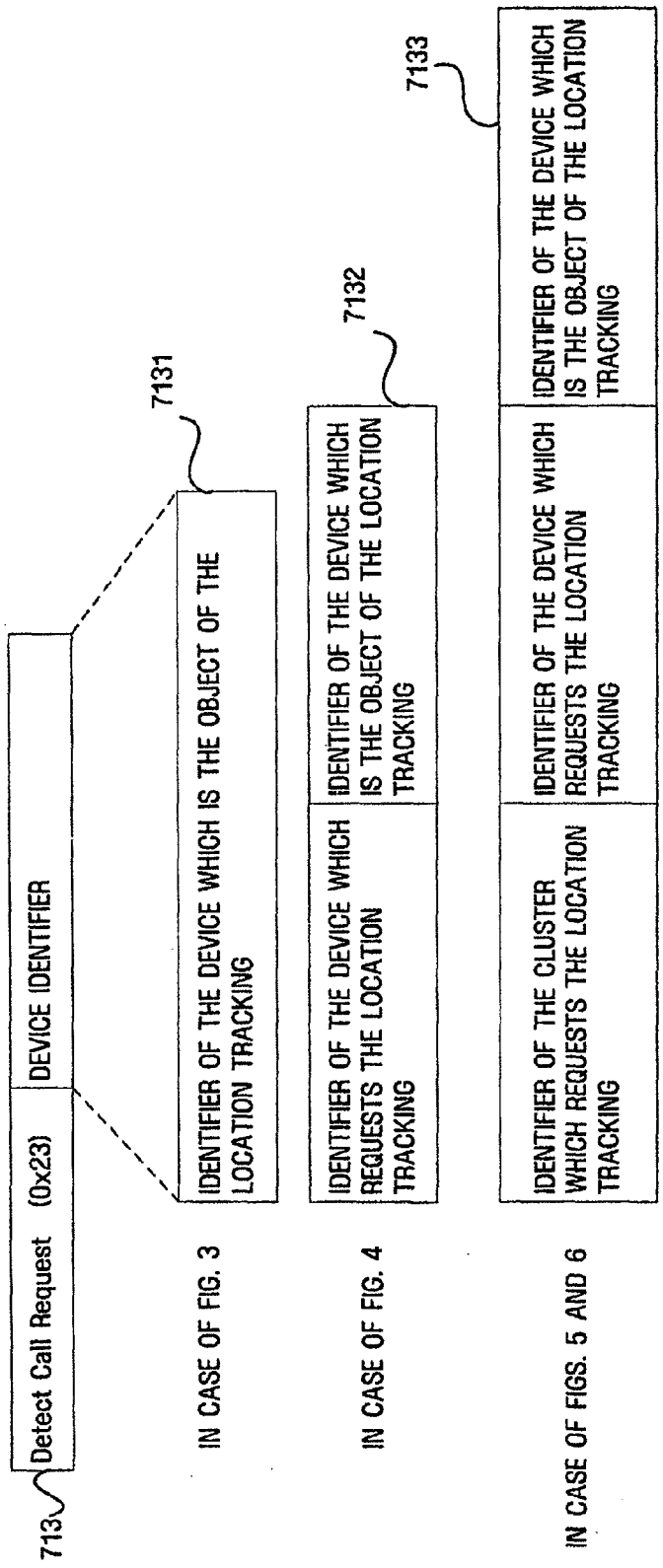

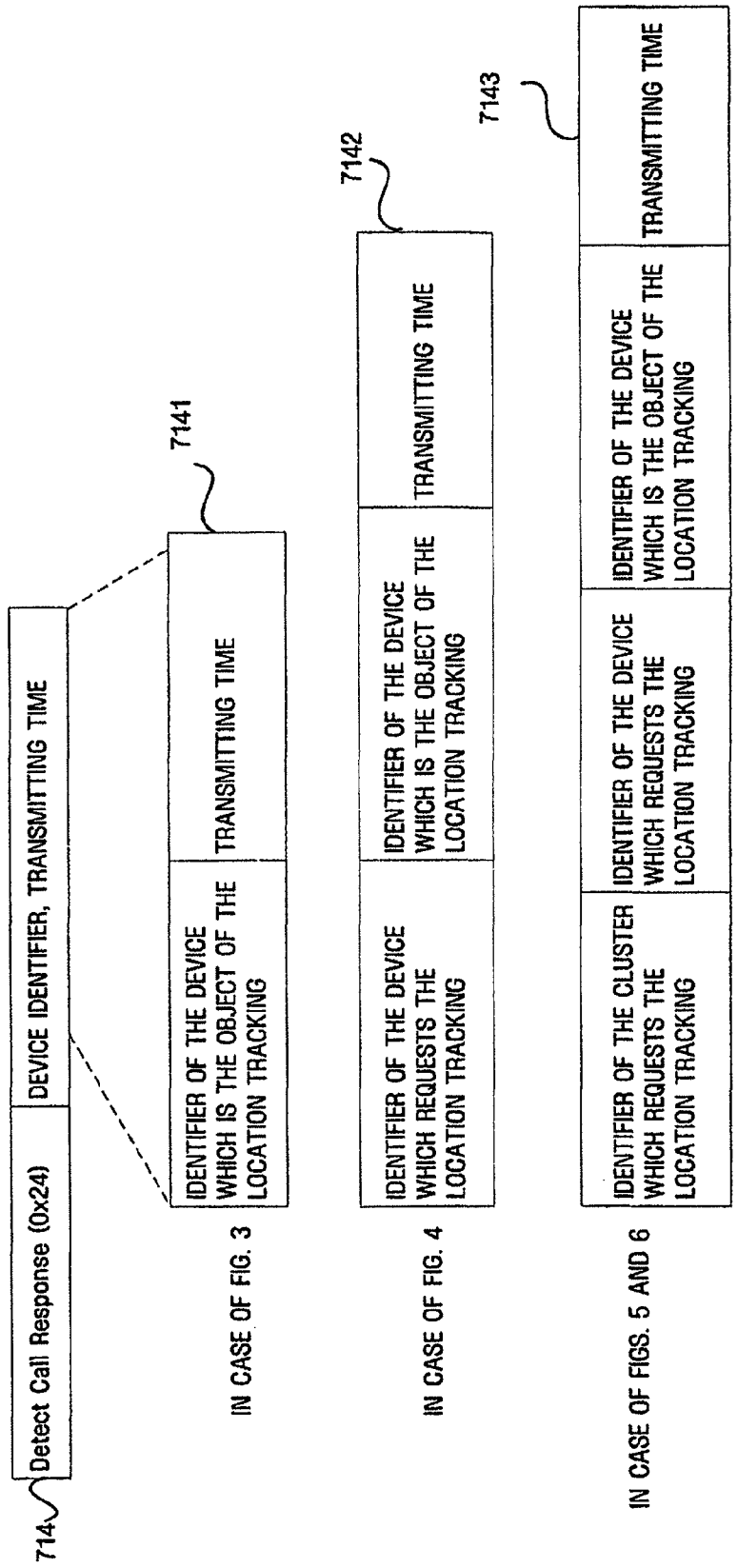

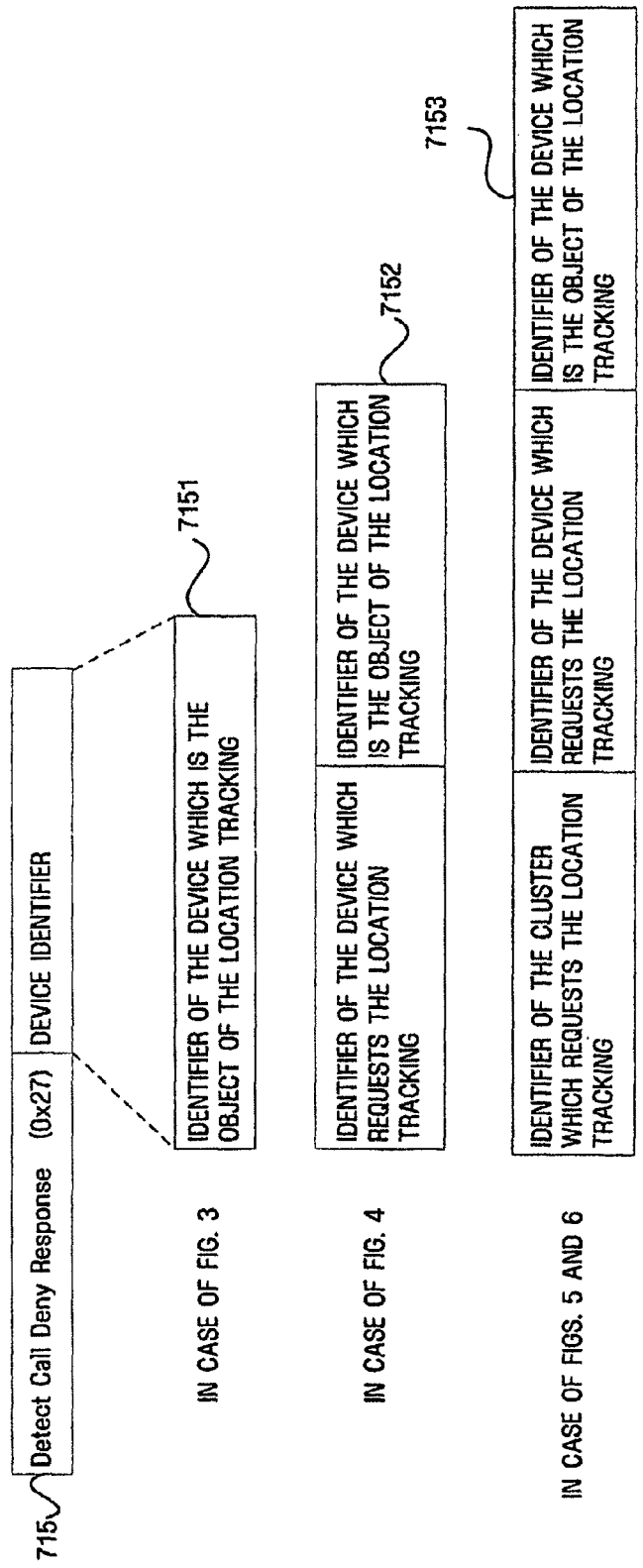

LOCATION TRACKING METHOD IN COORDINATOR-BASED WIRELESS NETWORK

CROSS-REFERENCE TO RELATED APPLICATIONS

This is a Continuation of U.S. patent application Ser. No. 11/189,061 filed on Jul. 26, 2005, which claims priority from Korean Patent Application Nos. 10-2004-0058263 and 10-2004-0086226 filed on Jul. 26, 2004 and Oct. 27, 2004, respectively, in the Korean Intellectual Property Office. The entire disclosures of the prior applications are considered part of the disclosure of the accompanying continuation application and are hereby incorporated by reference in their entirety.

BACKGROUND OF THE INVENTION

1. Field of the Invention

Methods consistent with the present invention relate to location tracking in a coordinator-based wireless network.

2. Description of the Related Art

A recent trend in networking is to interconnect devices that need to exchange data, in addition to computers. In the past, wired networking was the norm. But, the disadvantages of the wired networking, such as wiring construction and limited mobility, necessitate wireless communication technology. Wireless Local Area Network (WLAN) and Wireless Personal Area Network (WPAN) standards are being developed. A WPAN has a range of 10 m, while WLAN has a range of 50 m to 100 m. The WPAN is more suitable for electronic home appliances in terms of mobility and range because it consumes less power and supports Ad-hoc networking.

The coordinator-based wireless network uses a coordinator to manage the communication time and competition mode of the wireless network. It uses many of the protocols decided by IEEE 802.15 working group, which was founded to establish a WPAN standard. The IEEE 802.15 working group is divided into four task groups. TG 1 works on the standards for WPAN based on Bluetooth 1.x. TG 2 studies co-existence of the wireless networks. TG 3 studies Ultra Wideband (UWB), which provides a high transmission rate of 20 Mbps or more with low power consumption. TG 4 studies Low Rate WPAN (LR-WPAN), a technology to provide a low transmission rate (maximum 250 kbps) at a low power consumption.

LR WPAN is concerned with low-cost communication networks that require low data transmission rates. The IEEE 802.15.4 standard known as "ZigBee" is a wireless transmission technology for networks of low cost, low power devices such as wireless integration remote controllers, home appliance controllers, building management controllers and toys. The ZigBee group was established in July, 2000 and since then it has finished working on the standards for the physical layer and MAC.

The standard specifies that the transmission is 250 kbps (16 channels in the 2.4 GHz band) or 40 kbps/20 kbps (10 channels in the 915 MHz band or one channel in the 868 MHz band), and the range is 1 m to 100 m.

Work is still being done on the upper layer, which includes a network layer. Fifty companies including Philips, Motorola, Honeywell, Mitsubishi, Invensys, and Samsung are promoters in a ZigBee Alliance in order to supplement the existing standard by adding ad-hoc wireless networking and a network protocol for dispersed devices.

ZigBee does the job of preparing check lists and specifically defining applications to practically perform the interoperability test. The requirements of IEEE 802.15.4 include low power consumption, low cost, and simple infrastructure. These requirements are necessary to network sensors and control devices.

IEEE 802.15.4a defines the standard for a low-rate location-based network using Ultra Wideband (UWB), which is a new networking technology implementing a precise location awareness service making a ubiquitous environment achievable.

IEEE 802.15.4a is a subgroup of 802.15.4 and it uses the same Medium Access Control (MAC) as 802.15.4, but substitutes UWB for the Physical Layer (PHY). But, it does not define a location tracking protocol. So, a location-based service has to be added to the coordinate-based wireless network to embody the location tracking technology of IEEE 802.15.4a. A privacy protection service should also be added in a manner that allows a user control over the location tracking.

SUMMARY OF THE INVENTION

An aspect of the present invention is to provide a location tracking function in a coordinator-based wireless network.

Another aspect of the present invention is to track the location of a device based on a wireless communication technology such as UWB by using the location tracking function of the coordinator-based wireless network.

The aspects of the present invention are not limited to the above-mentioned aspects and other aspects which are not mentioned will become more apparent from the below description by those of ordinary skill in the art.

The present invention provides a location tracking method in a coordinator-based wireless network. The location tracking method in a coordinator-based wireless network according to one exemplary embodiment of the present invention comprises transmitting a first frame including an identifier and time information to the wireless network by a device associated to the wireless network in order to disclose its location; and receiving a response frame including the location information of the device transmitted from the wireless network.

The location tracking method in a coordinator-based wireless network according to an exemplary embodiment of the present invention comprises transmitting a first frame including identifiers of a first device and a second device to the wireless network so that the first device associated to the wireless network becomes aware of the location of the second device; and receiving a response frame including location information of the second device transmitted from the wireless network by the first device.

The location tracking method in a coordinator-based wireless network according to an exemplary embodiment of the present invention comprises receiving a first frame including an identifier of a first device which requests location tracking of a second device and an identifier of the second device from the wireless network by the second device; and transmitting a second frame including the identifier of the first device, the identifier and the time information of the second device to the wireless network by the second device, as the response of the first frame.

The location tracking method in a coordinator-based wireless network according to an exemplary embodiment of the present invention comprises receiving a first frame including an identifier of a first device which requests location tracking of a second device, and an identifier of the second device from the wireless network by the second device; determining whether location tracking is allowed; and if location tracking is allowed, the second device transmits a second frame including the identifier of the first device, and the identifier and the time information of the second device to the wireless network, as the response to the first frame.

The location tracking method in a coordinator-based wireless network according to an exemplary embodiment of the present invention comprises receiving a first frame including an identifier and time information of a device transmitted by the device; obtaining location calculating information used in calculating the location of the device using the time information; and transmitting a second frame including the identifier of the device and the location calculating information to a network coordinator.

The location tracking method in a coordinator-based wireless network according to an exemplary embodiment of the present invention comprises receiving a first frame including an identifier of a first device which requests location tracking of a second device, an identifier and time information of a second device transmitted by the second device; obtaining location calculating information used in calculating the location of the second device using the time information; and transmitting a second frame including the identifier of the first device, the identifier of the second device and the location calculating information to a network coordinator.

The location tracking method in a coordinator-based wireless network according to an exemplary embodiment of the present invention comprises receiving a plurality of frames including an identifier of a device and location calculating information of the device from the network; calculating the location of the device using the location calculating information; and transmitting a frame including location information to the device.

The location tracking method in a coordinator-based wireless network according to an exemplary embodiment of the present invention comprises receiving a plurality of frames including an identifier of a first device which requests location tracking of a second device, an identifier and location calculating information of a second device from a network; calculating the location of the second device using the location calculating information; and transmitting a frame including the location of the second device to the first device.

The location tracking method in a coordinator-based wireless network according to an exemplary embodiment of the present invention comprises receiving a first frame including an identifier of a first device which requests location tracking of a second device, and an identifier of a second device from a network; transmitting the first frame to the second device of the network; receiving a second frame for notifying that location tracking has been denied from the second device; and transmitting the second frame to the first device.

The location tracking method in a coordinator-based wireless network according to an exemplary embodiment of the present invention comprises receiving a first frame including an identifier of a first device and an identifier of a second device transmitted by the first device so that the coordinator of a first wireless network can track the second device; transmitting a second frame including an identifier of the first wireless network, the identifier of the first device and the identifier of the second device to the coordinator of a second wireless network by the coordinator of the first wireless network; receiving a third frame including the identifier of the first wireless network, the identifier of the first device, the identifier of the second device and the location information of the second device transmitted by the coordinator of the second wireless network, by the coordinator of the first wireless network, as the response to the second frame; and transmitting a fourth frame including the location information of the second device to the first device by the coordinator of the first wireless network.

The location tracking method in a coordinator-based wireless network according to an exemplary embodiment of the present invention comprises receiving a first frame including an identifier of a first device and an identifier of a second device transmitted by the first device so that the coordinator of a first wireless network can track the second device; transmitting a second frame including the identifier of the first wireless network, the identifier of the first device and the identifier of the second device to the coordinator of a second wireless network by the coordinator of the first wireless network; receiving a third frame including the identifier of the first wireless network, the identifier of the first device, the identifier of the second device by the coordinator of the first wireless network, as the response of the second frame, if the second device which received the second frame denies location tracking; and transmitting a fourth frame including the information that the second device denies location tracking to the first device by the coordinator of the first wireless network.

The location tracking method in a coordinator-based wireless network according to an exemplary embodiment of the present invention comprises receiving a first frame including an identifier of a first wireless network, an identifier of a first device which requests location tracking of a second device, and an identifier of a second device transmitted by the coordinator of the first wireless network, by a coordinator of a second wireless network; transmitting a second frame including the identifier of the first wireless network, the identifier of the first device and the identifier of the second device to the second device associated with the second wireless network by the coordinator of the second wireless network; receiving a plurality of third frames including the identifier of the first wireless network, the identifier of the first device, the identifier of the second device and location calculating information of the second device from the second wireless network by the coordinator of the second wireless network; calculating the location of the second device using the location calculating information of the second device by the coordinator of the second wireless network; and transmitting a fourth frame including the identifier of the first wireless network, the identifier of the first device, the identifier of the second device and the calculated location information of the second device to the coordinator of the first wireless network by the coordinator of the second wireless network.

The location tracking method in a coordinator-based wireless network according to an exemplary embodiment of the present invention comprises receiving a first frame including an identifier of a first wireless network, an identifier of a first device which requests location tracking of a second device, and an identifier of a second device transmitted by the coordinator of the first wireless network; transmitting a second frame including the identifier of the first wireless network, the identifier of the first device and the identifier of the second device to a coordinator of a third wireless network by the coordinator of the second wireless network; receiving a third frame including the identifier of the first wireless network, the identifier of the first device, the identifier of the second device and the location information of the second device transmitted by the third wireless network, by the coordinator of the second wireless network; and transmitting a fourth frame including the identifier of the first wireless network, the identifier of the first device, the identifier of the second device and the location information of the second device to the coordinator of the first wireless network by the coordinator of the second wireless network.

BRIEF DESCRIPTION OF THE DRAWINGS

The above and other aspects of the present invention will become more apparent by describing in detail exemplary embodiments thereof with reference to the attached drawings in which:

FIGS. 10, 11, 12 are block diagrams illustrating command payloads of a frames according to an exemplary embodiment of the present invention.

DETAILED DESCRIPTION OF EXEMPLARY EMBODIMENTS OF THE INVENTION

Figure 1:
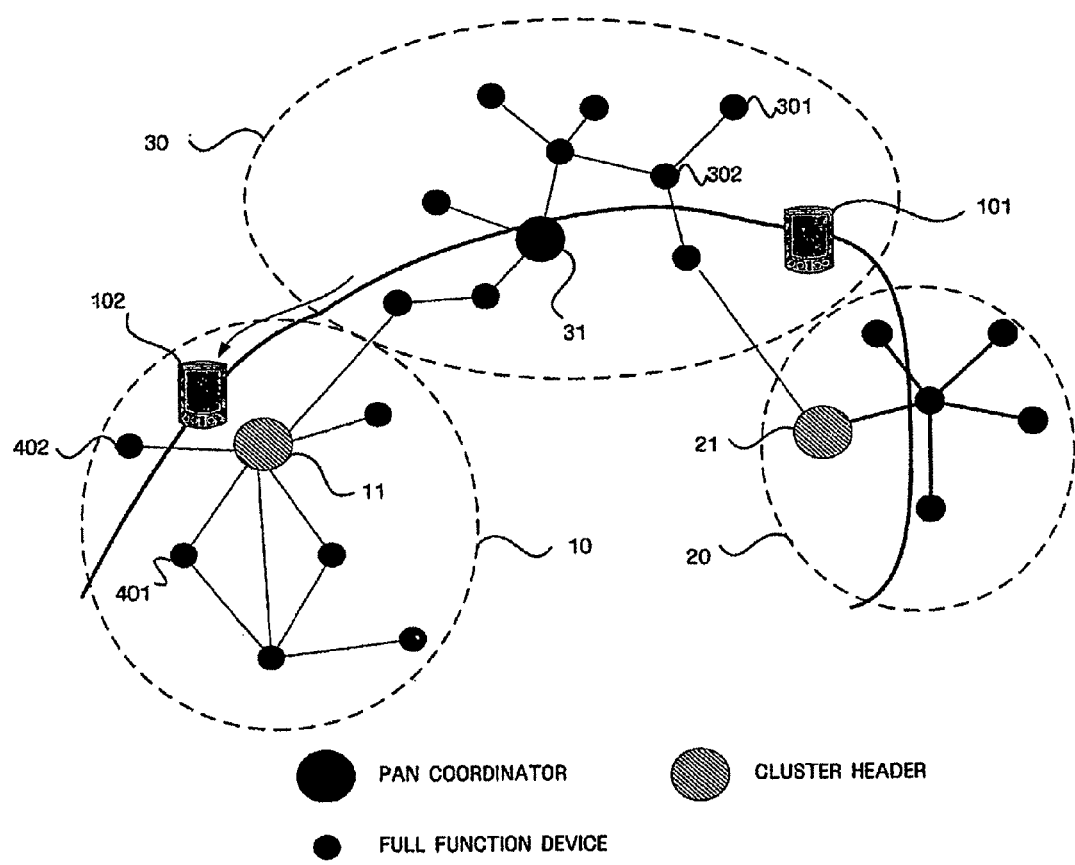
FIG. 1 illustrates the structure of a cluster-tree network of 802.15.4 according to an exemplary embodiment of the present invention.

Terminology used in the specification will be described in the following.

Coordinator-Based Wireless Network

A network including a wireless network device functioning as a coordinator (hereinafter, referred to as coordinator-based wireless network) forms a single independent wireless network on the basis of the coordinator. If pluralities of coordinator-based wireless networks exist in the same area, each coordinator-based wireless network has a unique identification that distinguishes it. The coordinator-based network is different from an infrastructure network for performing wireless communication through an access point or a base station, and it may include a plurality of coordinators and be included in an ad-hoc network. The coordinator can transmit time information required for a wireless network, and the wireless network devices that receive this information can transmit it to other network devices. In this specification, an IEEE 802.145.4 coordinator-based wireless network will be described, but this is only an exemplary embodiment of the present invention and the present invention is not limited to this.

Beacon Frame

The beacon frame notifies of the existence of a network and it also performs an important role in the maintenance of the network. The beacon frame includes a payload that is required when network devices associate with the network. The network coordinator periodically transmits the beacon frame so that a device participating in the wireless network can recognize the network.

Probe Request

The probe request frame is sent by a network device to find a network.

Probe Response

The network coordinator which receives the probe request from the network device transmits a probe response frame which sets information required when the device associates with the network.

Device, Network Device

The device is a component of the wireless network that can communicate with other devices. For example, in IEEE 802.15.4, in addition to the wireless integration remote controller and the electronic home appliance controller, there is a building management controller, a toy, a mouse, and a cooker. A device having a communication function, a controlling function and a sensor function in a home network or a ubiquitous environment is also included.

Location Awareness Frame

The location awareness frame allows both the network device and other devices to know its location. The other devices that receive the location awareness frame can become aware of the location of the network device through a location tracking algorithm. The location awareness frame may include the time of transmission of the frame, an identifier of the seeking device, and an identifier of the device that is the object of the location tracking.

Location Information Positioning Frame (Location Calculating Information Frame)

The location information frame includes the location of the device, which is calculated using the frame transmission time and the frame reception time, the angle of the received signal including the frame or the received signal strength. The location may be expressed as a time difference; that is, the difference between the frame transmission time and the frame reception time.

Location Result Frame

The location result frame includes the location information obtained by a specific device that receives the location information frame (the location calculating information frame). This frame may be transmitted to a device that wants to know its own location.

Location Awareness Request Frame

The location awareness request frame is to request the transmission of the location awareness frame so that a device located outside the cluster can know the location of a specific device. The location awareness request frame can be transmitted by a cluster coordinator located outside the cluster or by a coordinator located inside the cluster. In addition, the location awareness request frame can be transmitted by a device located inside or outside the cluster, which can insert its identifier in the frame.

FIG. 1 illustrates the structure of a cluster-tree network of 802.15.4 according to an exemplary embodiment of the present invention. 802.15.4 includes the star, peer-to-peer, and cluster-tree topology which is a modification of peer-to-peer topology.

The star topology is shown by reference numeral 20 of FIG. 1 and has one network coordinator 21. The communication between the network devices is performed by this coordinator, and a full function device (FFD) and a reduced function device (RFD) can participate in the star topology. The full function device can communicate with other network devices and can act as the network coordinator. The reduced function device can communicate only through the network coordinator. The reduced function device cannot become the network coordinator, since it cannot independently communicate with other devices.

Reference numeral 10 of FIG. 1 shows a peer-to-peer topology having one network coordinator. Devices can communicate with the other devices in this type of network. The above-mentioned reduced function device cannot participate in a peer-to-peer network.

The cluster-tree network is the modification of the peer-to-peer topology and it may integrate several networks (e.g., 10, 20, and 30). It is composed by associating at least two networks. Each network is called a cluster. In FIG. 1, there are three clusters 10, 20, 30 and the network coordinators of these clusters are labeled 11, 21, and 31, respectively. The network coordinator of the cluster is called a cluster header. The coordinator 31, which is a PAN coordinator, for coordinating the cluster-tree network can be determined among the network coordinators. It may be preferable that the PAN coordinator 31 has more computing capability and resources than the other network devices. The device passing through the network of FIG. 1 can communicate with the network devices in the corresponding cluster according.

Location awareness can be largely divided into two cases. In the first case, the network device requests location awareness from the PAN coordinator or the cluster header in order to know its location. In the other case, the PAN coordinator or the cluster header requests the location of the network device. The former is referred to as a self location awareness request and the latter is referred to as a remote location awareness request.

For convenience of explanation, hereinafter, the network device that has its location tracked is referred to as a tracked device and the network device that receives the location tracking information from the tracked device is referred to as a reference device.

Figure 2:
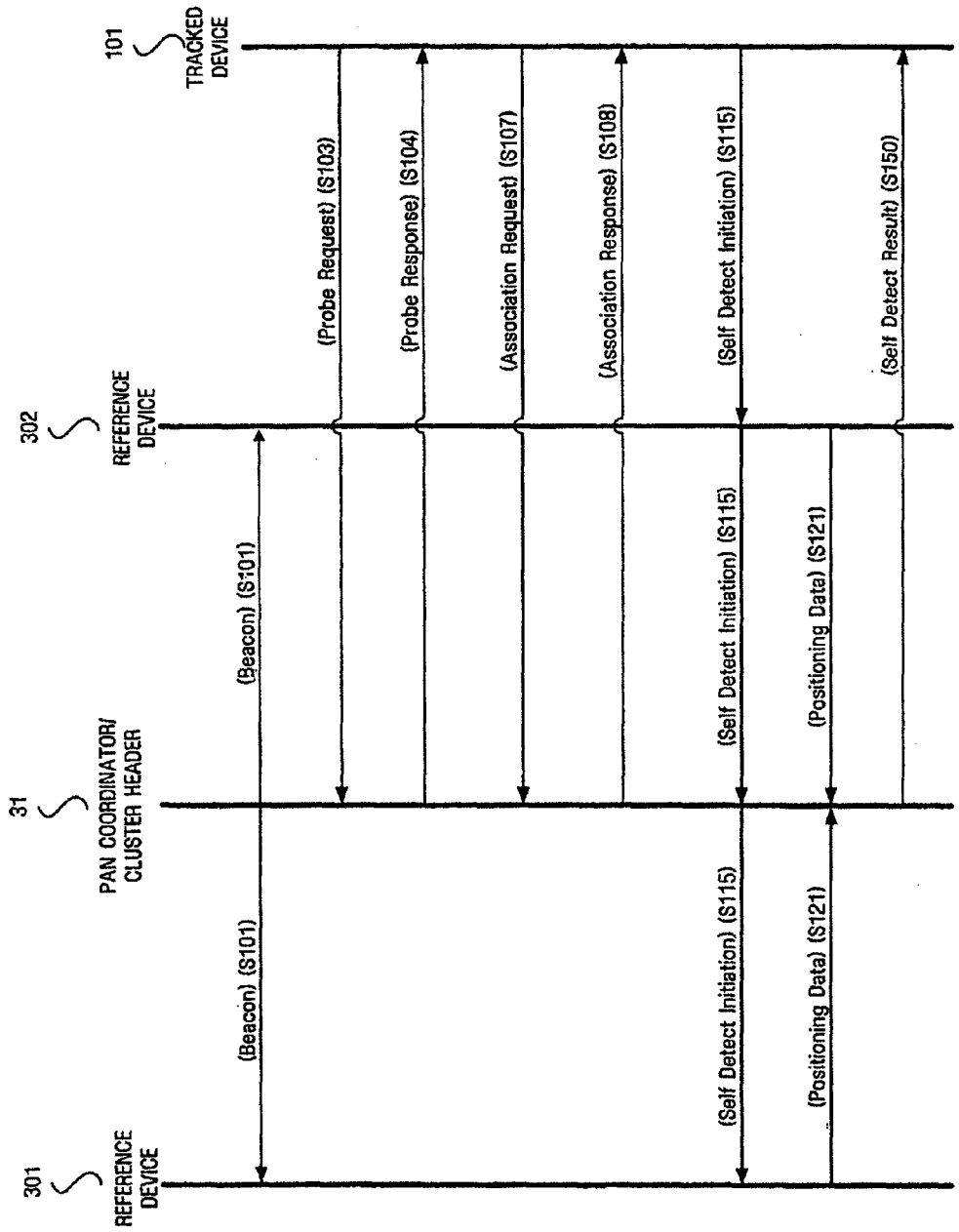
FIG. 2 is a flowchart illustrating the process which a tracked device requests the self location awareness to a coordinator according to an exemplary embodiment of the present invention.

FIG. 2 is a flowchart illustrating the process where a tracked device requests the self location awareness from a coordinator according to an exemplary embodiment of the present invention. In FIG. 2, the tracked device 101, which participates in the cluster, requests location awareness in order to know its location, and the PAN coordinator or the cluster header serves as the coordinator. A cluster is a portion of the network in FIG. 1, but it can be the entire network if there is only one cluster. Among various topologies of IEEE 802.15.4, cluster-tree network (the most complicated topology) is illustrated in the present specification, but the star or the peer-to-peer topology may be applied.

FIG. 2 shows the active scanning process. The coordinator 31 continuously transmits a beacon frame (S101). However, the tracked device 101, which has not received the beacon frame, transmits a probe request frame in order to notify that it wants to participate in the network (S103). The coordinator 31 becomes aware that a device wants to participate in the network and transmits a probe response frame including the network information (S104). The tracked device 101 obtains the information required for network association through the received probe response frame and transmits an association request frame (S107). The coordinator 31 transmits an association response frame, which sets the information required for the association, to the tracked device (S108). Hereafter, the tracked device can communicate with the network. The tracked device associated to the network transmits a self detect initiation frame in order to search its location (S115). This frame is received by reference devices 301, 302 and the coordinator 31 (the PAN coordinator or the cluster header). Using the received signal strength (RSS) of the frame and the time information included in this frame, the position of the tracked device can be calculated. The reference devices 301, 302 transmit positioning data to the coordinator 31 (S121) and the coordinator 31 calculates the location using this data and the location tracking algorithm. If the coordinator 31 transmits a self detect result frame including the location value to the tracked device 101 (S150), the tracked device 101 becomes aware of its location. Then, if the tracked device 101 is moved, it can become aware of its location through operations S115 to S150, because it is associated with the network. The location tracking algorithm will be explained in the following.

The difference between the reference device and the tracked device depends on whether it is the object to be tracked. Accordingly, since the tracked device 101 became aware of its location, it can now become a reference device. In case that another device participates in the network, the tracked device 101 can act as a reference device and receive the location information of the other device. Also, even when the device 101 acts as a reference device, a new location thereof may be ascertained through operations 115 to 150, if the device 101 is moved. That is, although the device is a reference device, it may become the tracked device again. The difference between the reference device and the tracked device depends on whether it is the reference for ascertaining a device location or the object to be tracked.

Figure 3:
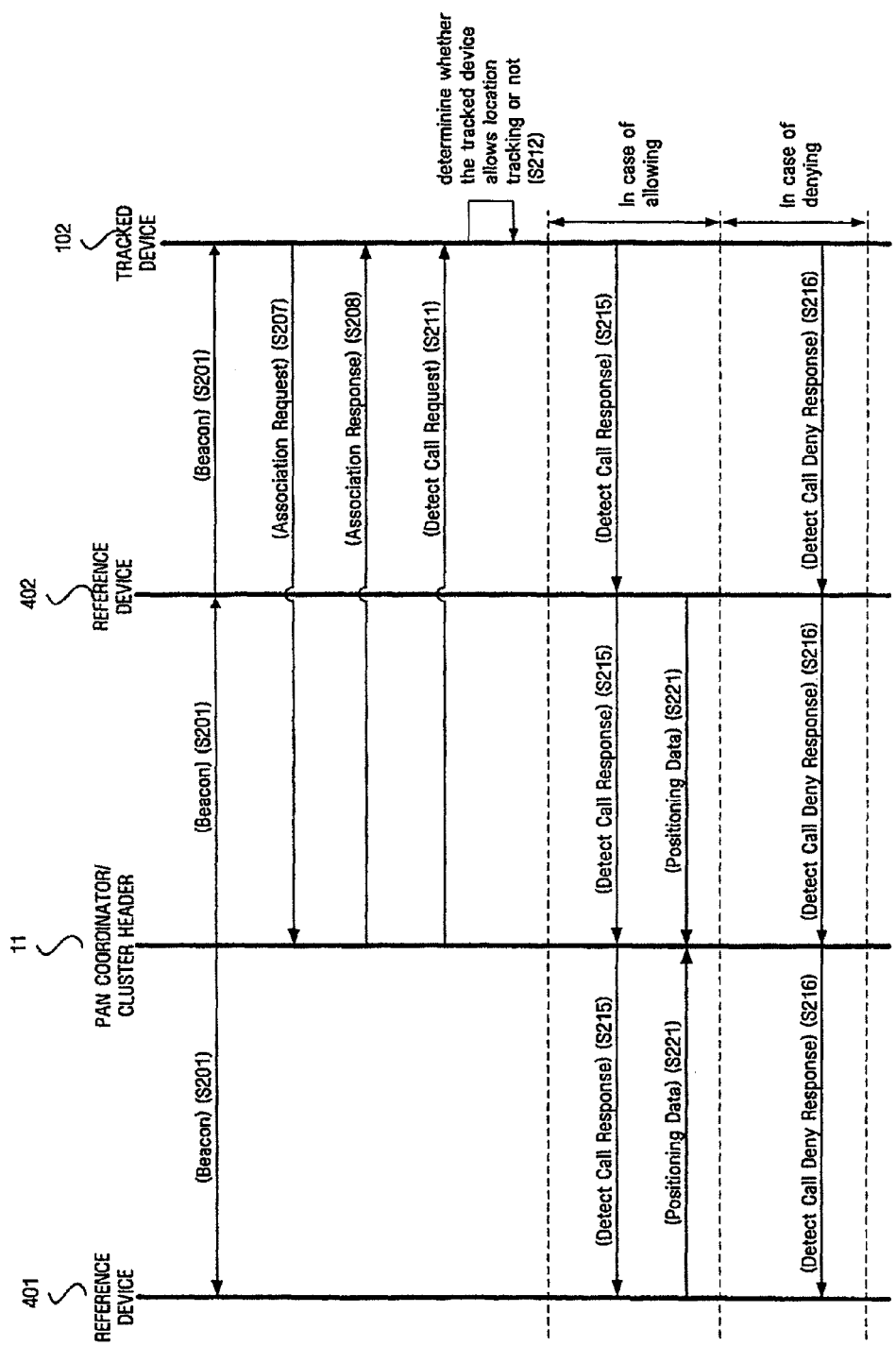
FIG. 3 is a flowchart illustrating the process which the coordinator requests the remote location awareness to the tracked device according to an exemplary embodiment of the present invention.

FIG. 3 is a flowchart illustrating the process where the coordinator 11 requests the remote location awareness according to the other exemplary embodiment of the present invention. FIG. 3 shows an example of a passive scanning process where the network coordinator searches for the tracked device and transmits the information. A new network device is labeled a tracked device 102, in order to distinguish from the other network devices. The coordinator 11 continuously transmits a beacon frame in order to maintain and manage the network (S201). The tracked device, which becomes aware of the existence of the network by the beacon frame, transmits an association request frame (S207). If the coordinator 11 transmits the association response frame accepting the association request (S208), the tracked device 102 can communicate with the network.

The coordinator 11, which has associated the tracked device with the network, transmits a detect call request frame in order to know the location of the tracked device (S211). The detect call request frame is different from the self detect initiation frame of FIG. 2. In order to ensure privacy, whether the tracked device 102 allows location tracking is determined in operation S212. When the tracked device 102 allows location tracking, it transmits its location information to the coordinator and the peripheral devices.

The tracked device 102 transmits the detect call response frame, which contains its network identifier and a timestamp, so that its location can be known (S215). The reference devices 401, 402 and the coordinator 11 which receive this frame positions the location and the related data of the tracked device by the information such as the received signal strength (RSS) of the frame and the time information included in this frame. The reference devices 401, 402 transmit this positioning data to the coordinator (S221) so that the coordinator 11 can calculate the location of the tracked device 102 using the location tracking algorithm.

When the tracked device 102 does not allow location tracking, the tracked device 102 transmits a detect call deny response frame to the coordinator 11 and the peripheral devices (S216).

The location information is important for network management. Accordingly, the coordinator 11 needs to know the location information of the devices composing the network or the cluster, although every device need not know the location information. Accordingly, the PAN coordinator or cluster header can get the location information of the devices according to the network configuration, though the device denies notifying its location.

When the location information is sent to both the PAN coordinator 31 and the cluster header 11 (case 1) the detect call deny response frame is transmitted (S216). When the location information is forcibly sent to only the PAN coordinator 31 (case 2) the tracked device cannot transmit the detect call deny response frame and the detect call response frame.

In case 2, there is a method for unconditionally transmitting the detect call response frame; that is, without asking the user whether he/she allows location tracking. For convenience of explanation, the method for transmitting the detect call response frame without user permission will be explained in the following.

When the coordinator that transmits the detect call request frame is the cluster header, the cluster header cannot obtain the location information of the other device, because only the PAN coordinator can forcibly obtain the location of the device. This is because the cluster exists only for a certain time. Accordingly, in case that the tracked device 102 denies notifying its own location, the detect call deny response frame is transmitted to the cluster header 11 and the reference devices 401, 402 (S216), and the process halts. When the location information is forcibly sent to the PAN coordinator and the cluster header the tracked device 102 cannot deny the detect call request. The location of the device is notified to the coordinator, regardless of user permission. As such, for user convenience, the process can progress to operations S215 to S221.

Operation S212 of FIG. 3 is optional. If the network can forcedly know the location between the devices, the process progresses, whether the tracked device allows or denies location tracking. If the tracked device 102 is forced to allow location tracking, the process is progresses to the operation where the tracked device transmits the detect call response frame, without transmitting the message that asks for permission. At this time, only operations S201 to S221 are performed. The location information may be transmitted to the coordinator even if the user denies location tracking, but it is varied according to the allowance or denial of the user.

On the other hand, for the sake of convenience, the user can previously set the response of the tracked device 102. For example, when the device that requests location tracking is the coordinator, the detect call response frame can be set to be unconditionally transmitted. The response may be set such that the tracked device 102 allows every device or only devices in the cluster to which it belongs to track its location. After the response is set, the detect call response frame is transmitted to only the allowed device or the coordinator, and the detect call deny response is transmitted to all other devices, without user input. The location tracking method of FIG. 3 includes privacy protection. Accordingly, operations S212 to S216 may be omitted according to the structure of the network.

FIGS. 2 and 3 show the process for participating in the network and for obtaining the location of the tracked device 102. The process of FIG. 2 for actively associating with the network the device that requests self location awareness is not necessarily performed. The self detect initiation frame can be transmitted after the tracked device is associated with the network by the passive scanning of FIG. 3. On the contrary, even after the active network scanning of FIG. 2, the coordinator may transmit the detect call request frame in order to know the location of the tracked device 102. Also, the reference device can be a relay device that receives the frame for establishing the location of the tracked device, and sends the location information contained in this frame to the cluster header.

Figure 4:
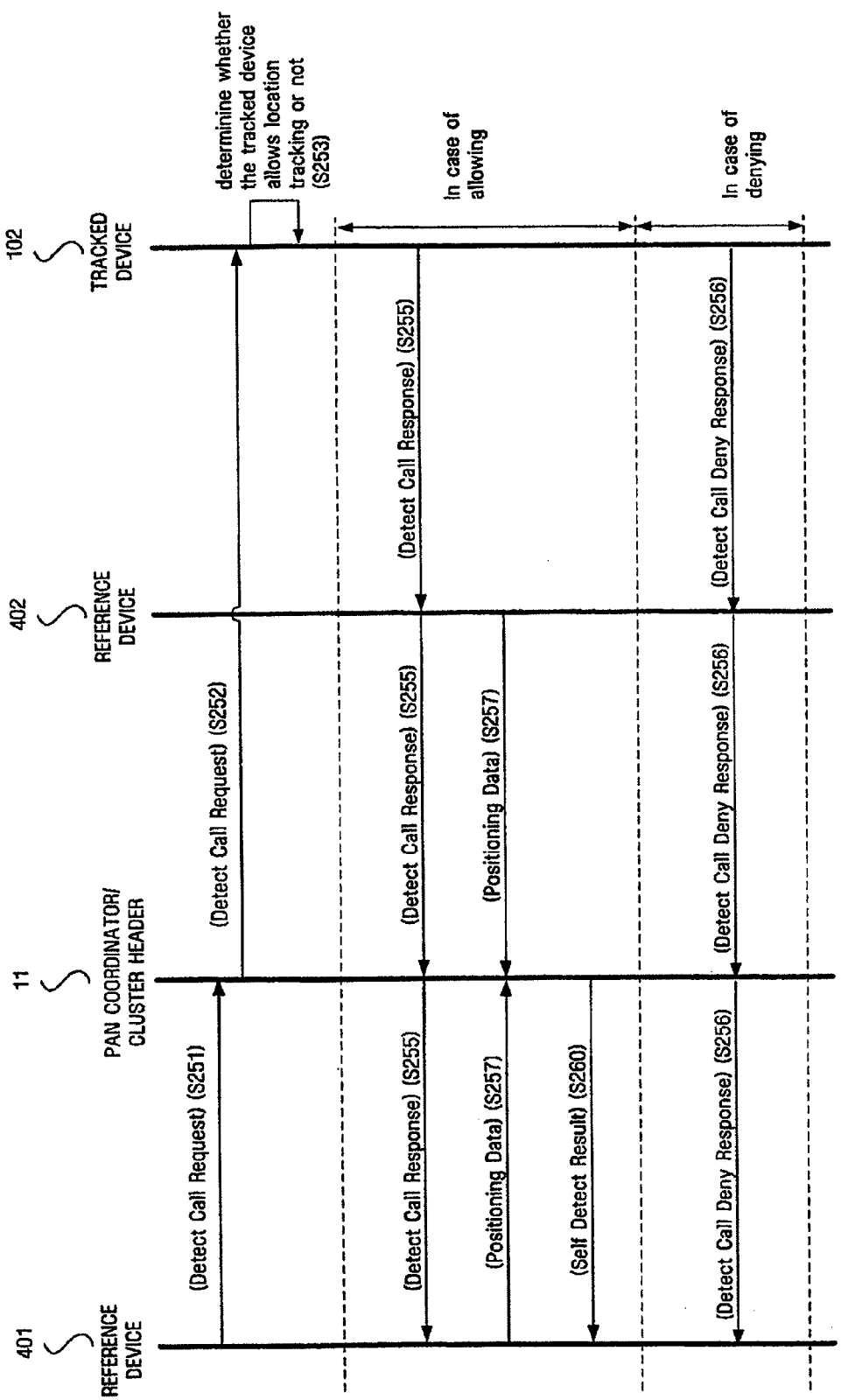
FIG. 4 is a flowchart illustrating the process which the device other than a PAN coordinator or a cluster header requests the location tracking of the other device according to an exemplary embodiment of the present invention.

FIG. 4 is a flowchart illustrating the process where a device other than a PAN coordinator or a cluster header requests location tracking of a third device according to an exemplary embodiment of the present invention. In addition to FIGS. 2 and 3, additional operations may be needed. Since tracking the location of the other device may infringe user privacy, a location tracking request can be sent. The reference device 401 can request location tracking of the device 102. At this time, the device 401 can include its identifier and request the identifier of the tracked device in the frame (S251). The coordinator (the cluster header) 11 receives the detect call request frame and transmits it to the tracked device 102 (S252). The tracked device 102 becomes aware that the reference device 401 wants to track its location. A message such as: "A device 401 requests location tracking. Will you allow location tracking?" may be displayed to the user of the tracked device 102. If the user sees the message and allows location tracking, the frame including the time information for tracking its own location (detect call response frame) is transmitted (S255). The reference devices 401, 402 receive the detect call response frame, calculate positioning data and transmit this data to the coordinator (the cluster header) 11 (S257). The coordinator 11 then transmits the location information of the tracked device 102 to the reference device 401 (S260).

However, when the user does not allow location tracking in operation S253, the device 102 transmits the detect call deny response frame to the coordinator 11 and the reference devices 401, 402 (S256).

In FIG. 4, the information on whether the user of the tracked device 102 allows or denies the detect call response frame can be previously set, and it can be set for every device or for specific device(s). By this setting, the user can maintain his/her privacy, without having to respond to location tracking queries.

Figure 5:
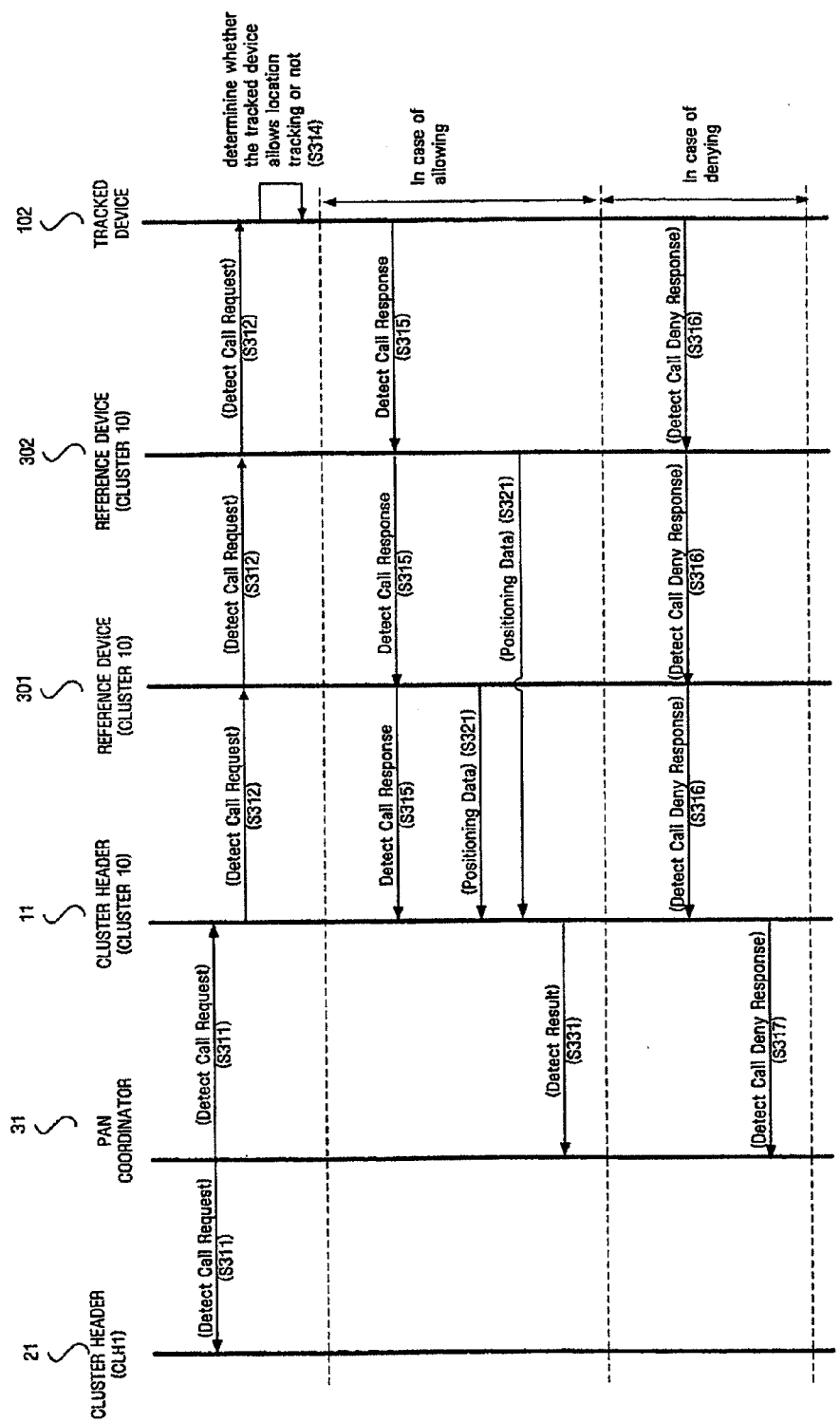
FIG. 5 is a flowchart illustrating the process for tracking the location of the tracked device which exists at the outside of the cluster in which the PAN coordinator exists according to an exemplary embodiment of the present invention.

FIG. 5 is a flowchart illustrating the process of tracking the location of a tracked device that exists outside the cluster that the PAN coordinator resides in according to an exemplary embodiment of the present invention. The embodiment of FIG. 5 includes the case where the PAN coordinator 31 requests the location of the tracked device 102, and the case where another device requests the location of the tracked device 102.

The PAN coordinator 31 transmits the detect call request frame to the cluster headers 11, 21 in operation S311 in order to track the location of a specific device. The PAN coordinator 31 can also receive the location tracking frame transmitted by the cluster header CLH1 21 and transmit it to the whole network. The cluster header 11 which receives this frame transmits the detect call request frame in order to know if the tracked device exists in its cluster (S312). Operations S311 and S312 may have the same or different content according to the embodiment of the frame. The frame is received by the cluster header 11 in operation S311 and it is transmitted to the network devices in its cluster in operation S312. The tracked device 102 receives the detect call request frame and determines whether it allows location tracking (S314).

If location tracking is allowed, a detect call response frame including location information is transmitted to the reference devices 401, 402 and the cluster header 11 (S315). The reference device transmits positioning data, which is obtained from information included in the received detect call response frame, to the cluster header 11 (S321). As a result, the cluster header 11 becomes aware of the location of the tracked device 102 and it transmits a detect result frame to the PAN coordinator 31 (S331).

Also, in this situation the process can progress even without asking the user of the tracked device whether he/she allows location tracking as previously described with reference to FIG. 3. Even if there is a denial response from the user, the detect call response frame can be transmitted to the PAN coordinator 31.

If a third device attempts to track the location of the tracked device 102 through the PAN coordinator 31 or if the PAN coordinator 31 does not force location tracking of the other device, the user of the tracked device 102 can prevent its location from being tracked. Here, the tracked device 102 transmits the detect call deny response frame to the reference devices 301, 302 and the cluster header 11 (S316). The cluster header 11 transmits the received detect call deny response frame to the PAN coordinator 31 (S317) and the PAN coordinator 31 becomes aware that the tracked device cannot be tracked. Also, the detect call deny response frame can be transmitted to other devices that request the location of the tracked device 102.

Figure 6:
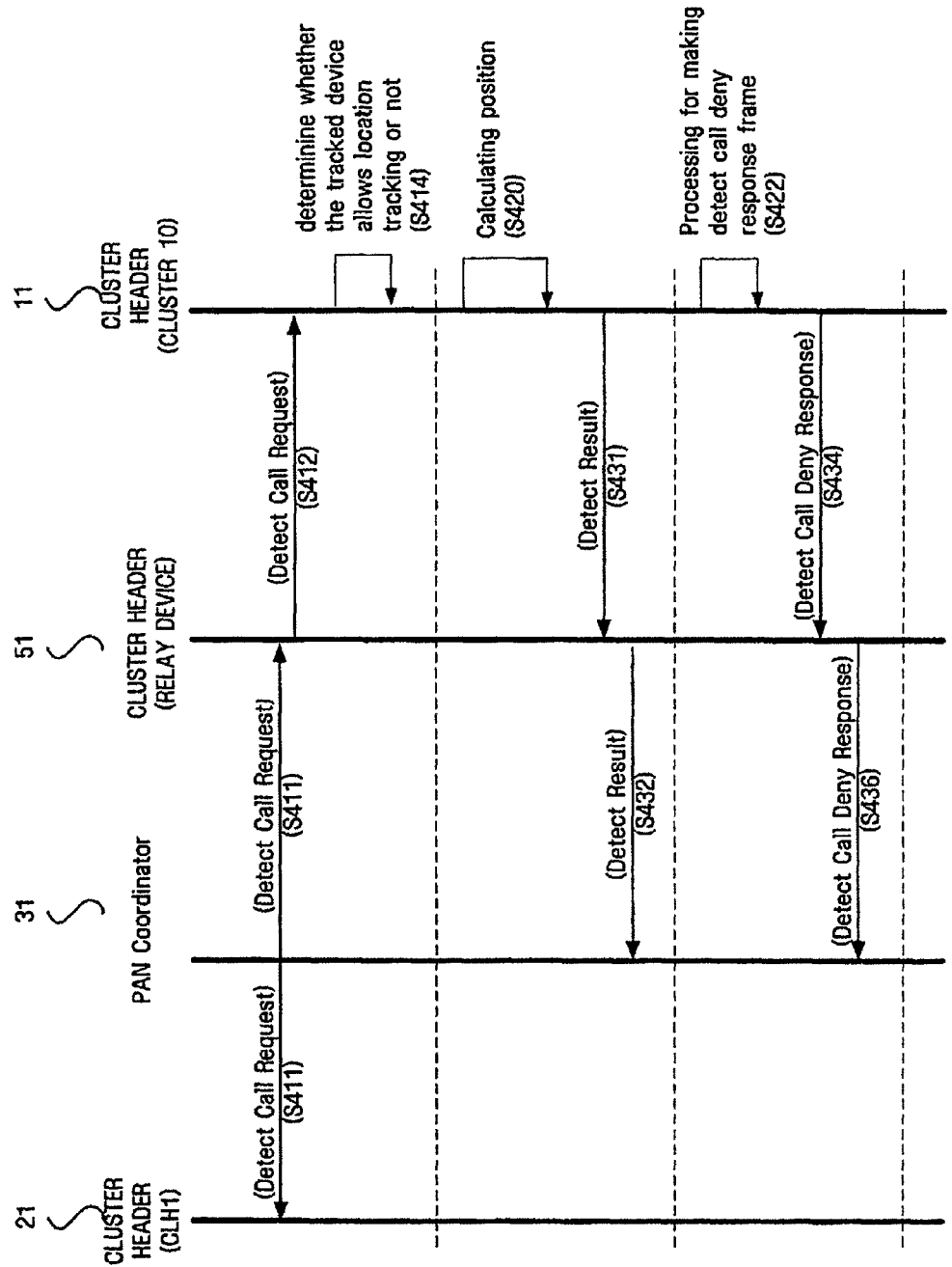
FIG. 6 is a flowchart illustrating the process for tracking the location of the tracked device which exists at the outside of a relay device according to an exemplary embodiment of the present invention.

FIG. 6 is a flowchart illustrating the process of device location tracking using a relay device according to another exemplary embodiment of the present invention. The PAN coordinator may directly transmit the detect call request to the cluster header or it may indirectly transmit it to the cluster header through another cluster header. Accordingly, the cluster header that receives and transmits the detect call request frame functions as a relay device.

In FIG. 6, the PAN coordinator transmits the detect call request frame to the cluster header 51 (S411). The cluster header 51 transmits the detect call request frame to a third cluster header 11 (S412) and cluster header 11 tracks the location of the device, which exists in its cluster. Here, different methods are performed depending on whether the tracked device allows or denies location tracking, as illustrated in the examples of FIGS. 2 to 5.

When the tracked device allows its location to be tracked in operation S414, the cluster header 11 calculates position of tracked device in operation S420, and tracks the location and transmits the detect result frame to the cluster header 51 (S431), which also transmits the detect call request frame (S432).

When the tracked device denies location tracking in operation 5414, the cluster header 11 makes detect call deny response frame in operation S422, and transmits the detect call deny response frame (S434). The relay device 51 that receives the detect call deny response frame transmits the detect call deny response frame to the PAN coordinator 31 (S436).

There is various location tracking algorithms that can be used.

Figure 7:
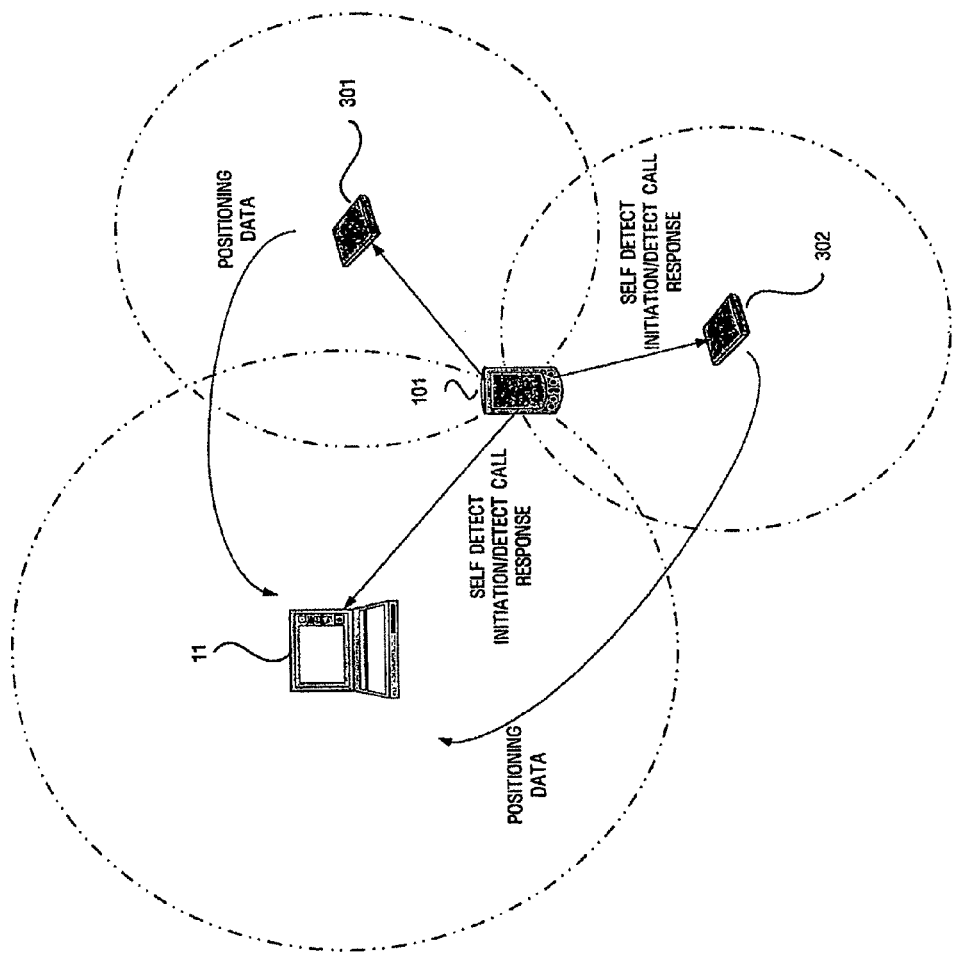
FIG. 7 is a concept diagram illustrating the location tracking by a TOA method according to an exemplary embodiment of the present invention.

FIG. 7 is a concept diagram illustrating location tracking by a Time of Arrival (TOA) method according to an embodiment of the present invention. The TOA method measures the delivery time of the signals sent between the tracked device 101 and the other network devices 11, 301, 302 in order to calculate the distance. The signal delivery time can be obtained by the difference between the transmission times of the frames (for example, the self detect initiation and the detect call response). By calculating this difference and knowing the speed of the signal containing the frame, three spherical ranges with the network devices 11, 301, 302 as their centers are obtained. Three devices are required to perform the calculation of this method. If at least three reference devices transmit the values, the coordinator 11 can select the three data values that are judged to be the most accurate. In one embodiment, the accuracy of the data values can be judged by the received signal strength. For example, Table 1, shown below, lists four devices 11, 301, 302, 307 and the RSS and Positioning Data of signals sent by these devices. Since the device 307 of Table 1 has the weakest received signal strength, it is disregarded (the positioning data from this device may be inaccurate).

TABLE 1

RSS Values and Positioning Data

| DEVICE | RSS | POSITIONING DATA (m) |
|---|---|---|
| 11 | 70 | 15 |
| 301 | 80 | 10 |
| 302 | 90 | 8 |
| 307 | 30 | 10 |

However, the received signal strength is exemplary, and the reference device may be determined according to the signal distortion or other characteristics of the signal.

Figure 8:
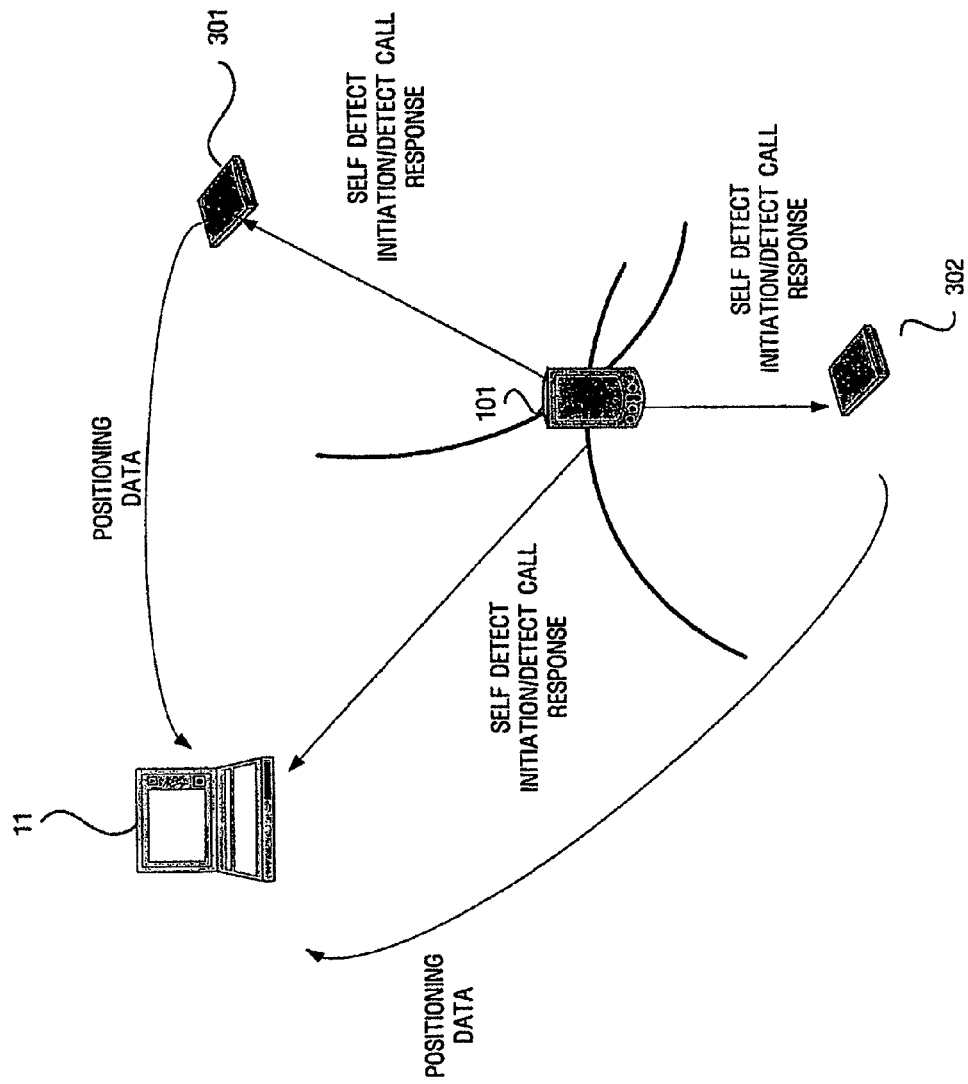
FIG. 8 illustrates the structure illustrating the location tracking by the TDOA method according to an exemplary embodiment of the present invention.

FIG. 8 illustrates location tracking by the Time Difference of Arrival (TDOA) method according to an exemplary embodiment of the present invention. The TDOA method measures the difference between the arrival times of two signals to determine the location, and it includes a forward link method composed of multiple signal sources and one receiver and a reverse link method composed of one signal source and multiple receivers. The basic principle of TDOA is the signal arrival time difference is proportional to the difference between the distances from the two signal sources to the receiver. These distances are calculated and a receiver is chosen that is equidistant from the two signal sources, that is, a hyperbola centering on the two signal sources. At this time, each base station must be synchronized and the time synchronization of the base stations is accomplished using a satellite clock. Two hyperbolas are obtained from three signal sources and the intersection point of the two curves is the location of the receiver.

FIG. 8 shows the application of TDOA to IEEE 802.15.4. Here, the intersection of the hyperbola obtained from the network devices 11, 301 and the hyperbola obtained from the network devices 11, 302 is the location of the tracked device 101. In order to obtain the intersection point between the hyperbolas, the TOA data is transmitted to the coordinator 11 by the reference network devices 301, 302. If the coordinator 11 receives several signals, it can select a device according to RSS and calculate the positioning data.

In addition to the methods depicted in FIGS. 7 and 8, an Angle of Arrival (AOA) method and a Radio Frequency (RF) Finger Printer method may be used. The AOA method measures the incident angle of the frame signal transmitted from the tracked device and searches in this direction. In the present embodiment, the strongest signal can be selected among the values measured by several network devices.

The RF fingerprinting method takes a snapshot of the received signal, analyzes the snapshot and extracts a unique characteristic of the signal, and compares this signal with the existing database to locate the receiver in order to obtain a characteristic value of the frame transmitted by the tracked device.

The location tracking algorithms explained in the present specification are only exemplary.

Figure 9:
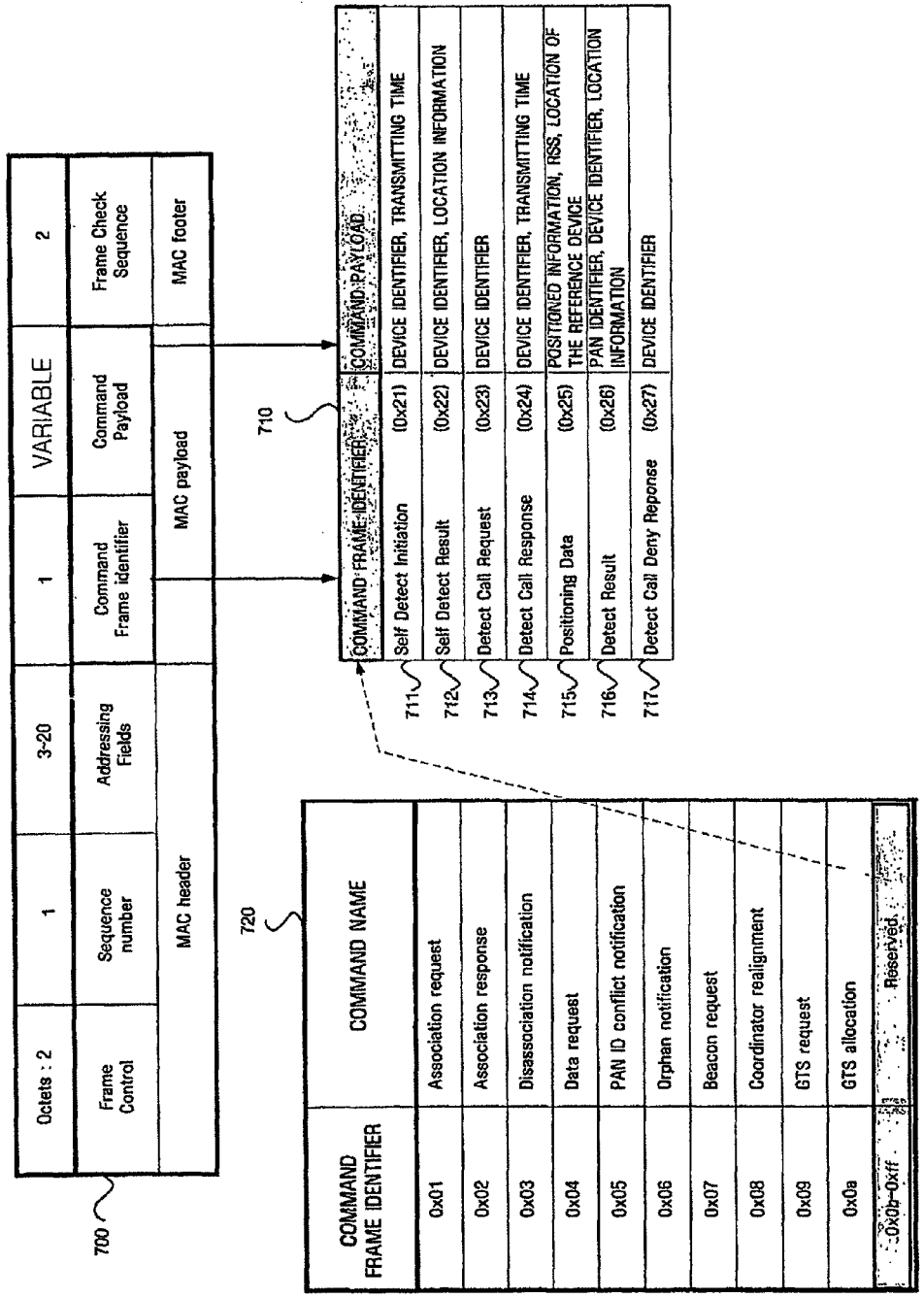
FIG. 9 illustrates a frame format of an MAC layer for embodying a location tracking function according to an exemplary embodiment of the present invention in 802.15.4.

FIG. 9 illustrates a frame format of an MAC layer for embodying a location tracking function according to an exemplary embodiment of the present invention. FIG. 9 illustrates one embodiment using the TOA algorithm and may be changed according to the location tracking method.

The frame control of the IEEE 802.15.4 command frame 700 is 16-bits, and contains the type of frame, an address field, and a control flag. The sequence number is a unique identifier for the frame. The address field is composed of the PAN identifier/address field of the receiving side and the PAN identifier/address field of the transmitting side. The command frame identifier illustrates which command is being performed and can take the values shown in table 720. 0x0b to 0xff are reserved and may be defined in the future. Accordingly, location tracking commands can be defined using these reserved identifiers.

The command payload is required to perform the command and can take the values shown in table 710.

The self detect initiation frame 711, which is transmitted when the tracked device wants to know its location, has the command frame identifier 0x21, and corresponds to a command payload consisting of a tracked device identifier and the frame transmission time. The other reference devices (including the coordinator) that receive the frame can calculate the distance using the frame transmission and reception time. This distance or the data is transmitted to the coordinator, thereby revealing the location of the tracked device.

The calculated result is transmitted by the self detect result frame 712 that has the command frame identifier 0x22 and a command payload consisting of the location information and the identifier of the tracked device.

Next, the structure of the detect call request frame 713, which is used when the coordinator wants to know the location of a specific network device, the detect call response frame 714 and the detect call deny response frame 717, which is transmitted in case of denying the location tracking, will be described. The detect call request frame 713 is sent when searching for a tracked device that exists in the sender's network and when searching for a reference device that does not exist in the sender's network. The command payload includes the identifier of the network device being searched for. The tracked device, which receives the frame, transmits the detect call response frame 714 to disclose its location. The command payload included herein may be the identifier of the tracked device and the transmission time, as the self detect initiation frame 711. On the other hand, when the tracked device denies location tracking, the detect call deny response frame 717 is transmitted. The command payload included herein may be the identifier of the tracked device.

The self detect initiation frame 711 and the detect call response frame 714 include basic data for location tracking. When using the TOA method or the TDOA method, the basic data may be the transmission time, and when using the RF fingerprinting method, the basic data may be the signal strength. By combining the information, the location of the tracked device can be calculated. The positioning data frame 715 serves the function of transmitting the calculated data to the coordinator. The calculated data may be the time difference between frame transmitting and receiving or it may be the distance information calculated from the time difference information. Also, the calculated data may be information combining the incident angle of the signal and the distance information. Further, the command payload may be the positioning data, which is calculated by the information included in the self detect initiation frame 711 and the detect call response frame 714, the RSS, and the location of the reference device, which calculated the data. The RSS is used in extracting the most reliable data when several network devices transmit the calculated data. Accordingly, the content of the payload may vary according to the location tracking algorithm. In addition, the location information of the reference device is needed, because the calculated data is relative to the location of the reference device. If the coordinator of the network stores the locations of all the devices that exist in its network, the location of the reference device need not be transmitted and can vary according to the embodiment of the coordinator.

The detect result frame 716 is used when the cluster header, to which the network device is associated, transmits the location information to the PAN coordinator when the PAN coordinator, which requests the location tracking of a specific network device, exists in a PAN different from that of the network device. The cluster header transmits the command frame and payload, which includes the PAN identifier, the identifier of the tracked device and the location information to the PAN coordinator.

The above-mentioned commands are one exemplary embodiment for embodying the location awareness, the detect result, the location awareness request and the location information frame used in claims of the present specification. The self detect request frame 711 and the detect call response frame 714 are examples of the location awareness frame, and the detect result frames 712, 716 are examples of the detect result frame. The detect call request frame 713 is an example of the location awareness request frame and the positioning data frame 715 is an example of the location information frame.

The device identifier of the command, for example, the device identifier defined by the detect call request frame 713 may include a plurality pieces of the identifier information by various methods. That is, the device identifier may include the identifier of the device be tracked, and the identifier of the device that requests the location tracking. In addition, when searching for a device in another cluster, the identifier of the target cluster should be included in addition to the device identifier.

FIGS. 10, 11, 12 are block diagrams illustrating command payloads of a frames according to an exemplary embodiment of the present invention.

FIG. 10 shows that the identifier information in the payload of the detect call request frame varies according to conditions. In the situation of FIG. 3, since the cluster header searches for the tracked device, frame 7131 consists only of the identifier of the tracked device. In the situation of FIG. 4, since the reference device searches for the tracked device, the frame 7132 includes the identifier of the device requesting the location tracking and the identifier of the tracked device. In the situations of FIGS. 5 and 6, since the device being tracked exists in another cluster, frame 7133 is constructed to include the identifier of the device requesting the location tracking, the cluster identifier, and the identifier of the device which is the object of the location tracking. To distinguish each frame, a check flag may be included in the command frame.

FIG. 11 shows that the identifier information in the payload of the detect call response frame varies according to conditions. Similar to FIG. 10, in the situation of FIG. 3, frame 7141 includes the identifier of the tracked device and the transmission time. In the situation of FIG. 4, since the reference device searches for the tracked device, frame 7142 includes the identifier of the device requesting the location tracking, the identifier of the tracked device, and the transmission time. In the situations of FIGS. 5 and 6, since the device being tracked exists in another cluster, frame 7143 includes the identifier of the device requesting the location tracking, the cluster identifier, the identifier of the device being tracked and the transmission time. To distinguish each frame, a check flag may be included in the command frame.

FIG. 12 shows that the identifier information in the payload of the detect call deny response frame varies according to conditions. 0x27 is the identifier for the detect call deny response frame. The structure is similar to that of the detect call response frame of FIG. 11, but it does not include information related to location tracking, such as the transmission time, because location tracking has been denied. The detect call deny response frame is the frame for notifying that the tracked device denies location tracking. In case of FIG. 3, the identifier 7151 of the device which is the object of the location tracking but denies the location tracking is included. Frame 7152 is transmitted when the tracked device denies location tracking, as in the situation of FIG. 4, and includes the identifier of the device requesting location tracking, and the identifier of the device that is the object of the location tracking. Frame 7153 is transmitted a device in another cluster requests location tracking, and it includes the cluster identifier of the cluster that the requesting device resides in, the device identifier, and the identifier of the device that is the object of the location tracking.

According to the present invention, the location of a device can be tracked in a coordinator-based wireless network.

Particularly, a protocol that can perform location tracking in an IEEE 802.15.4a environment is provided.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A location tracking method in a coordinator-based wireless network, the location tracking method comprising:
receiving from a first device a first frame including an identifier of the first device and an identifier of a second device so that a coordinator of a first coordinator-based wireless network can track the second device, wherein the second device is in a second coordinator-based wireless network separate from the first coordinator-based wireless network;
transmitting from the coordinator of the first coordinator-based wireless network a second frame including an identifier of the first coordinator-based wireless network, the identifier of the first device, and the identifier of the second device to a coordinator of the second coordinator-based wireless network;
receiving at the coordinator of the first coordinator-based wireless network a third frame including the identifier of the first coordinator-based wireless network, the identifier of the first device, the identifier of the second device and location information of the second device, transmitted by the coordinator of the second coordinator-based wireless network, as a response to the second frame; and
transmitting a fourth frame including the location information of the second device to the first device by the coordinator of the first coordinator-based wireless network,
wherein the first coordinator-based wireless network is a network in which the coordinator assigns channel time to other devices within the first coordinator-based wireless network for data transmission, wherein computing capability and resources of the coordinator are highest among all devices of the first coordinator-based wireless network, and
wherein if the coordinator of the second coordinator-based wireless network receives at least three location calculating information of the second device, the coordinator of the second coordinator-based wireless network selects three location calculating information that are determined based on their received signal strength values,
wherein the first and second wireless networks are based on the IEEE 802.15.4a protocol using Ultra Wideband (UWB) for the Physical Layer (PHY).

2. The method according to claim 1, wherein the identifiers of the first and second devices are medium access control (MAC) addresses of the first and second devices, respectively.

3. The method according to claim 1, wherein the devices of the first coordinator-based wireless network, at the time the first coordinator-based wireless network is initiated, comprise at least two network coordinators of previously established networks.

4. A location tracking method in a coordinator-based wireless network, the location tracking method comprising:
receiving from a first device a first frame including an identifier of the first device and an identifier of a second device, so that a coordinator of a first coordinator-based wireless network can track the second device, wherein the second device is in a second coordinator-based wireless network separate from the first coordinator-based wireless network;
transmitting from the coordinator of the first coordinator-based wireless network a second frame including an identifier of the first wireless network, the identifier of the first device, and the identifier of the second device to a coordinator of a second coordinator-based wireless network;
receiving at the coordinator of the first coordinator-based wireless network a third frame including the identifier of the first coordinator-based wireless network, the identifier of the first device, the identifier of the second device, as a response of the second frame, if the second device which received the second frame denies location tracking; and
transmitting from the coordinator of the first coordinator-based wireless network a fourth frame including information about the second device denying location tracking to the first device,
wherein the first coordinator-based wireless network is a network in which the coordinator of the first coordinator-based wireless network assigns channel time to other devices within the first coordinator-based wireless network for data transmission, wherein computing capability and resources of the coordinator are highest among all devices of the first coordinator-based wireless network, and wherein if the coordinator of the second coordinator-based wireless network receives at least three location calculating information of the second device, the coordinator of the second coordinator-based wireless network selects three location calculating information that are determined based on their received signal strength values, wherein the first and second wireless networks are based on the IEEE 802.15.4a protocol using Ultra Wideband (UWB) for the Physical Layer (PHY).

5. The method according to claim 4, wherein the identifiers of the first and second devices are medium access control (MAC) addresses of the first and second devices, respectively.

6. The method according to claim 4, wherein the devices of the first coordinator-based wireless network, at the time the first coordinator-based wireless network is initiated, comprise at least two network coordinators of previously established networks.

7. A location tracking method in a coordinator-based wireless network, the location tracking method comprising:

receiving from a coordinator of a first coordinator-based wireless network a first frame including an identifier of the first coordinator-based wireless network, an identifier of a first device which requests location tracking of a second device, and an identifier of a second device, by a coordinator of a second coordinator-based wireless network, wherein the second device is in the second coordinator-based wireless network which is separate from the first coordinator-based wireless network;

transmitting from the coordinator of the second coordinator-based wireless network a second frame including the identifier of the first coordinator-based wireless network, the identifier of the first device, and the identifier of the second device to the second device included in the second coordinator-based wireless network;

receiving from the second coordinator-based wireless network a plurality of third frames including the identifier of the first coordinator-based wireless network, the identifier of the first device, the identifier of the second device, and location calculating information of the second device, by the coordinator of the second coordinator-based wireless network;

calculating a location of the second device using the location calculating information of the second device by the coordinator of the second coordinator-based wireless network; and transmitting from the coordinator of the second coordinator-based wireless network a fourth frame including the identifier of the first wireless network, the identifier of the first device, the identifier of the second device and the calculated location of the second device to the coordinator of the first coordinator-based wireless network, wherein the first coordinator-based wireless network is a network in which the coordinator assigns channel time to other devices within the first coordinator-based wireless network for data transmission, wherein computing capability and resources of the coordinator are highest among all devices of the first coordinator-based wireless network, and wherein if the coordinator of the second coordinator-based wireless network receives at least three location calculating information, the coordinator of the second coordinator-based wireless network selects three location calculating information that are determined based on their received signal strength values, wherein the first and second wireless networks are based on the IEEE 802.15.4a protocol using Ultra Wideband (UWB) for the Physical Layer (PHY).

8. The method according to claim 7, wherein the identifiers of the first and second devices are medium access control (MAC) addresses of the first and second devices, respectively.

9. The method according to claim 7, wherein the devices of the first coordinator-based wireless network, at the time the first coordinator-based wireless network is initiated, comprise at least two network coordinators of previously established networks.

10. A location tracking method in a coordinator-based wireless network, the location tracking method comprising:

receiving, at a coordinator of a second coordinator-based wireless network from a coordinator of a first coordinator-based wireless network, a first frame including an identifier of the first coordinator-based wireless network, an identifier of a first device which requests location tracking of a second device, and an identifier of the second device, wherein the second device is included in a third coordinator-based wireless network;

transmitting to a coordinator of the third coordinator-based wireless network a second frame including the identifier of the first wireless network, the identifier of the first device, and the identifier of the second device by the coordinator of the second coordinator-based wireless network;

receiving at the coordinator of the second coordinator-based wireless network a third frame including the identifier of the first coordinator-based wireless network, the identifier of the first device, the identifier of the second device, and location information of the second device transmitted by the third coordinator-based wireless network; and transmitting from the coordinator of the second coordinator-based wireless network a fourth frame including the identifier of the first coordinator-based wireless network, the identifier of the first device, the identifier of the second device, and the location information of the second device to the coordinator of the first coordinator-based wireless network wherein the first coordinator-based wireless network is a network in which the coordinator assigns channel time to other devices within the first coordinator-based wireless network for data transmission, wherein computing capability and resources of the coordinator are highest among all devices of the first coordinator-based wireless network, and wherein if the coordinator of the third coordinator-based wireless network receives at least three location calculating information of the second device, the coordinator of the third coordinator-based wireless network selects three location calculating information that are determined based on their received signal strength values, wherein the first, second and third wireless networks are based on the IEEE 802.15.4a protocol using Ultra Wideband (UWB) for the Physical Layer (PHY).

11. The method according to claim 10, wherein the identifiers of the first and second devices are medium access control (MAC) addresses of the first and second devices, respectively.

12. The method according to claim 10, wherein the devices of the first coordinator-based wireless network, at the time the first coordinator-based wireless network is initiated, comprise at least two network coordinators of previously established networks.

\* \* \* \* \*